July 26, 1932.  H. E. BRACHT  1,869,299
PANCAKE TURNER
Filed March 2, 1931  2 Sheets-Sheet 1
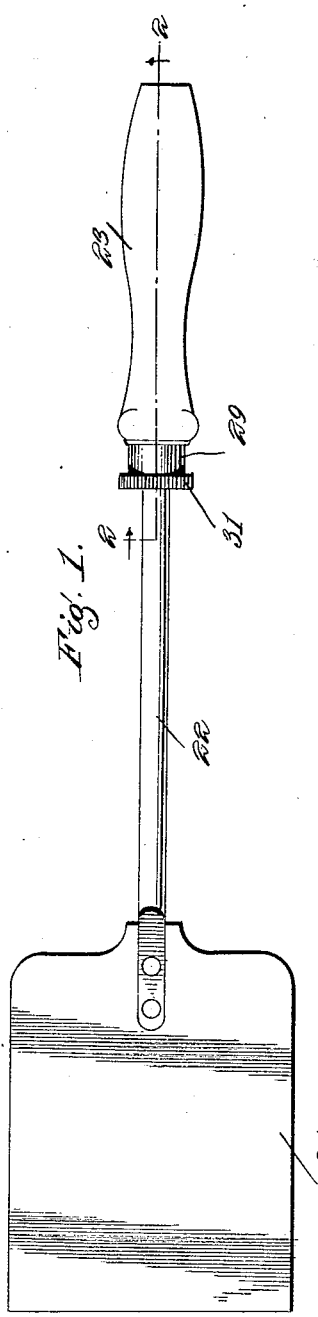
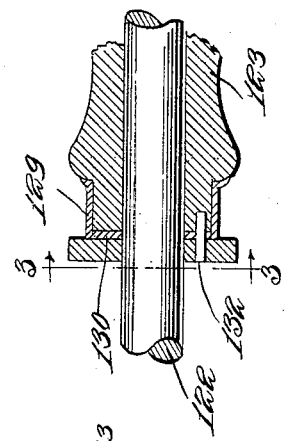
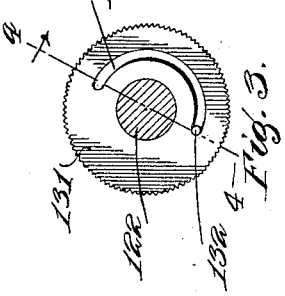
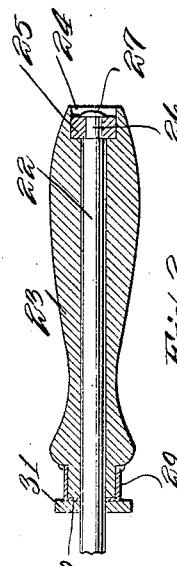
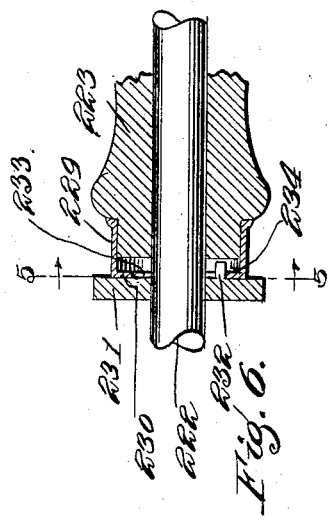
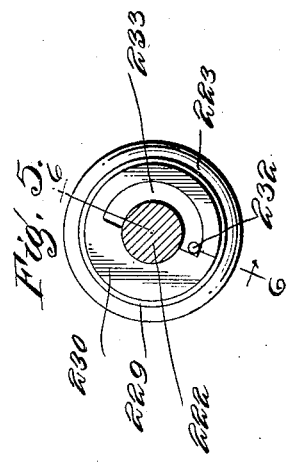
Inventor
*Harold E. Bracht*
By *John E. Baugh*
Attorney July 26, 1932. H. E. BRACHT 1,869,299
PANCAKE TURNER
Filed March 2, 1931  2 Sheets-Sheet 2
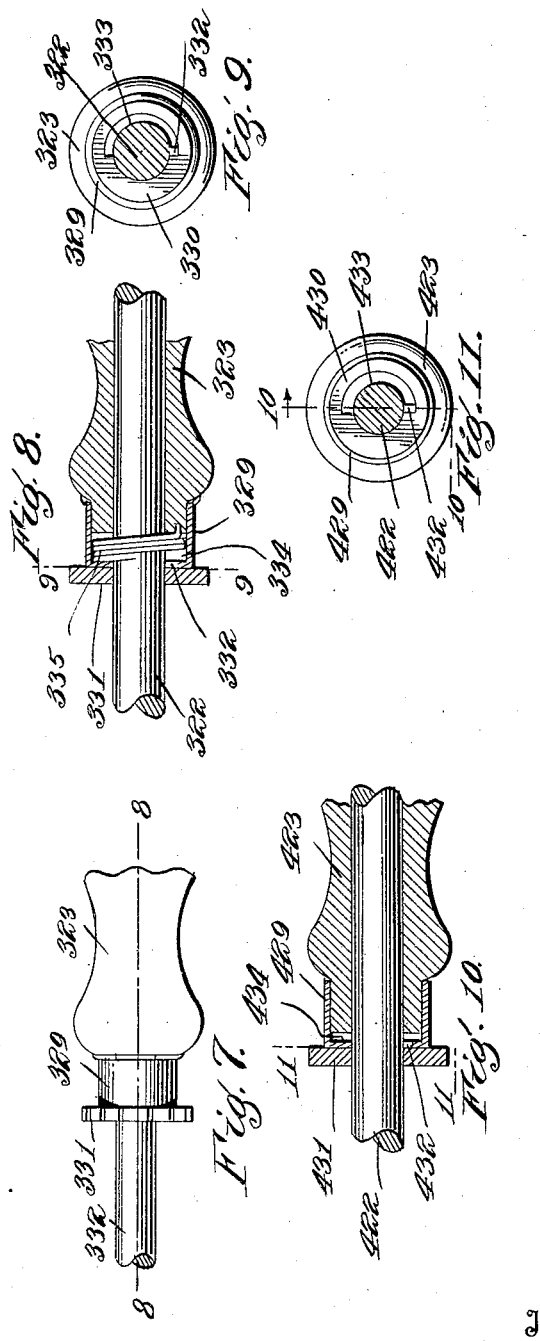
Inventor
Harold E. Bracht
John E. Baugas.
Attorney Patented July 26, 1932

1,869,299

UNITED STATES PATENT OFFICE

HAROLD E. BRACHT, OF EVERETT, PENNSYLVANIA, ASSIGNOR TO JOSEPH DE BRACHT, OF BEDFORD, PENNSYLVANIA

PANCAKE TURNER

Application filed March 2, 1931. Serial No. 519,622.

This invention appertains to improvements in pancake turners generally and has for an object to provide types thereof wherein the blade of each may be revolved in the supporting handle in a manner to turn or flap a pancake or flap-jack over from one side to the other, during cooking, by the movement of a thumb or finger of the hand of a user being employed at the moment to manipulate the same for the purpose.

Another object of the invention is to provide different forms of means for imparting turning or revolving movements to the blades of pan cake turners, each of which being of a more or less simple and inexpensive construction, highly efficient in operation and easy to manipulate.

With the foregoing and other equally important objects and advantages in view, the invention resides in the new and useful combinations, constructions and arrangements of parts as will be hereinafter more fully described, set forth in the appended claims and illustrated in the accompanying drawings, in which:

Figure 1 is a top plan view of a practical embodiment of the device,

Figure 2 is a fragmentary longitudinal section taken on the line 2—2 of Figure 1, Figure 3 is a slightly enlarged transverse section through a modified form, the same being taken on the line 3—3 of Figure 4, Figure 4 is a longitudinal section taken on the line 4—4 of Figure 3, Figure 5 is a transverse section of another form of the device, the same being taken on the line 5—5 of Figure 6, Figure 6 is a longitudinal section taken on the line 6—6 of Figure 5, Figure 7 is a fragmentary plan view of still another form of the device, Figure 8 is a longitudinal section taken on the line 8—8 of Figure 7, Figure 9 is a transverse section taken on the line 9—9 of Figure 8, Figure 10 is a longitudinal section taken on the line 10—10 of Figure 11 of a further modification of the invention, and Figure 11 is a transverse section taken on the line 11—11 of Figure 10.

Referring to the drawings, wherein like characters of reference designate corresponding parts throughout the several correlated views thereof, and more particularly to Figures 1 and 2, the embodiment of the invention, as shown therein by way of example only, is generally constituted in a blade 21, a shank or shaft 22 and a handle 23, wherein the blade 21 is secured at one end of the shaft 22 at the center of its rear edge, and the opposite end of the shaft 22 is secured for revolving movement in a bore extending longitudinally through the handle 23.

As shown in Figure 2, the rear end of the handle 23 is provided with a countersink 24 centered therein with respect to the longitudinal bore aforesaid and with which it communicates in order to house a collar or washer 25 mounted on a reduced portion 26 formed at the rear end of the shaft 22; the collar or washer 25 being secured in place on the shaft portion 26 in any suitable manner, as, for instance, peening the free end of the shaft portion 26, as at 27, after the collar or washer 26 has been positioned thereon.

The forward end of the handle 23 is protected by a metal ferrule 29 which has its outer end inwardly flanged, as at 30, to form a bearing surface for a thumb piece or wheel 31 mounted on the shaft 22 to facilitate the imparting of revolving movement to the latter when properly manipulated.

In the use of the device, as thus constructed and arranged, the handle 23 will be grasped in the hand, with the thumb resting on the periphery of the manipulator or wheel 31, so that, with the blade 21 horizontally disposed, a flap-jack or pancake may first be lifted from a griddle onto the latter in a usual manner and thereafter turned over or flipped to its reversed side and allowed to drop back onto the griddle by moving the thumb to impart a half revolution to the shaft 22 and the blade 21. When used by a right handed person, the natural movement of the thumb to revolve the shaft 22, as a consequence, will be to the left.

The thumb piece or wheel 31 is positioned on the shaft 22 at a point thereon to allow but very slight end thrust to the latter in order to permit of the comparative free revolving movement of the same in the bore of the handle without any tendency of the parts to bind; also the periphery of the thumb-piece or wheel 31 is preferably roughened or milled to prevent slippage of the thumb thereon.

In the form of the invention, as shown in Figures 3 and 4, a stop device is provided to limit the revolving movement of the shaft 122 to approximately a half turn, and the same is constituted in a pin 132 which projects from the forward end of the handle 123 and engages in a substantially semi-circular slot 133 formed in the thumb piece or wheel 131. The pin 132 has its inner end embedded in the material of the forward end of the handle 123 and its outer end projected outwardly through an opening formed in the inturned flange 130 of the ferrule 129. Otherwise this type of the device is identical in construction and operation to that form depicted in Figures 1 and 2.

In Figures 5 and 6, the stop pin 232 is carried at the inner side of the thumb-piece or wheel 231 for cooperative engagement in a substantially semi-circular slot 233 formed in the inturned flange portion 230 of the metal ferrule 229 mounted on the adjacent end of the handle 223. Here, the slot 233 is preferably formed in the inner edge of the flange 230 encircling the shaft 222. In order to give proper clearance to the pin 232, in its movements in the slot 233, a space 234 is preferably provided for between the forward end of the handle 223 and the inturned flange 230 at the outer end of the ferrule 229.

Referring now to Figures 7 to 9 inclusive, the invention as shown therein consists of the shaft 322 mounted as before in the handle 323 and having the thumb-piece or wheel 331 for manipulation to impart a partial revolving motion to the shaft and a blade carried thereby, but, in this instance, the stop pin 532 is extended radially from the shaft 322 for cooperative engagement in the slot 333 formed in the flange 330 of the ferrule 329.

This form of the device is, however, further modified by the mounting of a coiled spring 235 in the space 334, provided between the ferrule flange 329 and the adjacent end of the handle 323; one end of the spring being anchored in the handle end and its other end attached to the thumb-piece or wheel 331. This spring 335 is so arranged that it will oppose the operative turning movement of the shaft 322 by the thumb-piece or wheel 331, and, as a consequence, will be placed under tension during such movement in order that it will automatically reverse the revolving movement of the shaft 322 and a blade carried thereby, upon the removal of the thumb of the user from the thumb-piece or wheel 331, in order to return the shaft and blade to initial operative position without necessitating any shifting of the hand of the user relatively to the handle, as would ordinarily be required to properly position the blade flatwise as is required to lift and turn a flapjack or pancake.

In Figures 10 and 11, the arrangement of the shaft 422, the handle 423, the ferrule 429, the thumb-piece 431, the stop pin 432 and the slot 433, is substantially the same as in Figures 7 to 9, but the spring is here dispensed with, leaving the space 434 entirely clear.

Without further description, it is thought that the features and advantages of the invention will be readily apparent to those skilled in the art, and it will of course be understood that changes in form, proportion and minor details of construction may be resorted to, without departing from the spirit of the invention or its scope as claimed.

I claim:

1. A pancake turner comprising a handle, a shaft having a blade at one end and its other end mounted for revolving movement in said handle, and a circular thumb piece mounted on said shaft for imparting motion thereto when actuated.

2. A pancake turner comprising a handle, a shaft having a blade at one end and its other end mounted for revolving movement in said handle, a circular thumb piece mounted on said shaft for imparting motion thereto when actuated, and stop means for limiting the angular motion of said shaft.

3. A pancake turner comprising a handle, a shaft having a blade at one end and its other end mounted for revolving movement in said handle, a circular thumb piece mounted on said shaft for imparting motion thereto when actuated, and stop means cooperative with the handle and said shaft for limiting the angular motion of the latter.

4. A pancake turner comprising a handle, a shaft having a blade at one end and its other end mounted for revolving movement in said handle, a circular thumb piece mounted on said shaft for imparting motion thereto when actuated, and stop means cooperative with the handle and said thumb piece for limiting the angular motion of the latter.

5. A pancake turner comprising a handle, a shaft having a blade at one end and its other end mounted for revolving movement in said handle, a circular thumb piece secured to said shaft adjacent the forward end of said handle, and cooperative means carried by said handle and the thumb piece for limiting the angular movements of said shaft.

6. A pancake turner comprising a handle, a shaft having a blade at one end and its other end mounted for revolving movement in said handle, a circular thumb piece secured to said shaft adjacent the forward end of said handle for imparting an operative motion to the shaft, and a pin carried by said handle and engaged in a slot formed in said thumb piece for limiting the angular movements of said shaft.

7. A pancake turner comprising a handle, a shaft having a blade at one end and its other end mounted for revolving movement in said handle, a circular thumb piece secured to said shaft adjacent the forward end of said handle for imparting an operative motion to the shaft, a ferrule carried by said handle and having a slot therein, and a pin carried by said thumb piece and engaged in the said slot for limiting the angular movements of said shaft.

8. A pancake turner comprising a handle, a shaft having a blade at one end and its other end mounted for revolving movement in said handle, a circular thumb piece carried by said shaft for imparting limited angular motion thereto, and means for automatically returning said shaft to initial position.

9. A pancake turner comprising a handle, a shaft having a blade at one end and its other end mounted for revolving movement in said handle, a circular thumb piece carried by said shaft for imparting limited angular motion thereto, a ferrule carried by said handle and having a slot therein, a pin carried by said shaft and engaged in the said slot for limiting the angular movements, and means for automatically returning said shaft to initial position.

In testimony whereof I affix my signature.

HAROLD E. BRACHT.